(No Model.)
G. B. GRIGGS.
SADDLE.
No. 476,743. Patented June 7, 1892.
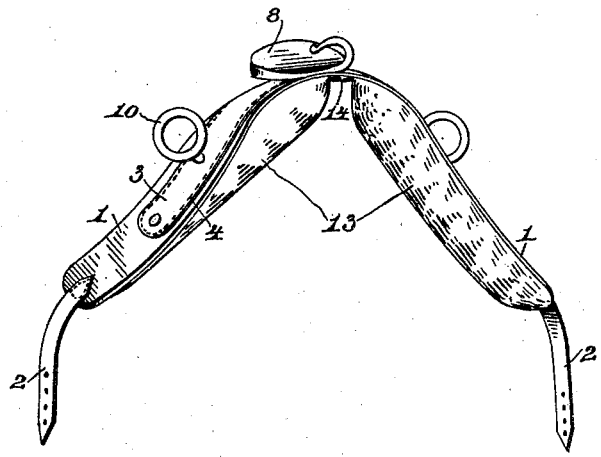
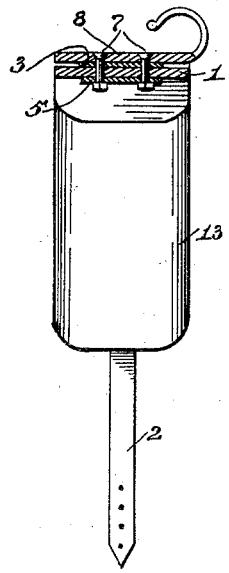
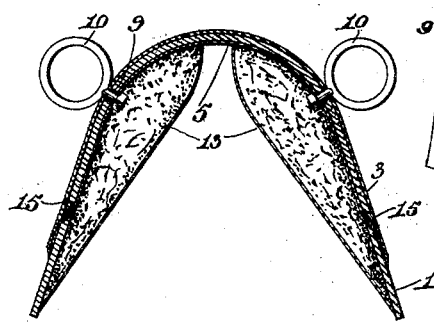
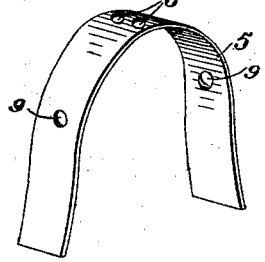
Witnesses:
C. M. Gallaher
W. S. Duvall
Inventor
G. B. Griggs
By his Attorneys,
C. A. Snow & Co.

UNITED STATES PATENT OFFICE.

GEORGE B. GRIGGS, OF ADA, OHIO, ASSIGNOR OF ONE-FOURTH TO FRANK S. BURKE, OF HOUSTON, TEXAS.

SADDLE.

SPECIFICATION forming part of Letters Patent No. 476,743, dated June 7, 1892.

Application filed November 29, 1890. Serial No. 373,040. (No model.)

*To all whom it may concern:*

Be it known that I, GEORGE B. GRIGGS, a citizen of the United States, residing at Ada, in the county of Hardin and State of Ohio, have invented a new and useful Saddle, of which the following is a specification.

This invention has relation to improvements in harness-saddles; and the objects in view are to provide a saddle consisting of few parts, all of which are of simple formation and construction and adapted for easy assemblage, said saddle being strong and durable, adapted to automatically conform in shape to the back of the animal, and to yield readily to all the movements of the thills and draft.

Other minor objects of the invention will appear in the following description and the novel features thereof will be particularly pointed out in the claim.

Referring to the drawings, Figure 1 is a perspective of a saddle constructed in accordance with my invention. Fig. 2 is a central transverse section. Fig. 3 is a detail in perspective of the resilient spring-metal tree. Fig. 4 is a longitudinal section of the device.

Like numerals of reference indicate like parts in all the figures of the drawings.

In practicing my invention I employ the usual skirt 1, ornamented in any suitable design and provided at its ends with the girth-straps 2. Upon the upper side of the skirt is secured the jockey 3, made of leather and extending a suitable distance down the opposite sides of the strip, to which it is secured by a line of stitching 4.

5 designates a thin, flexible, and resilient spring-metal strip constituting a saddle-tree, and the same is located upon the under side of the skirt, to which it is secured by a means hereinafter specified, and is given a proper curvature, so as to approximate the curvature and size of the back of the average animal, and is capable of readily yielding, either to increase the size or decrease the same in accordance with the back of the animal to which it is applied.

The skirt, jockey, and tree are provided with registering perforations 6, which receive the bolts 7 of the jockey-saddle 8. At each side of the saddle are perforations 9 for the terret-ring bolts 10.

As seen in Fig. 4, the skirt 1 is provided near its opposite ends with transverse slots 15, through which are passed the two ends of the spring-tree. The jockey is sufficiently long to overlap the ends of the spring-tree projecting through the openings 15 in the skirt, and the ends of the tree are bent flat upon the surface of the skirt. The jockey ends are secured over the spring-tree ends projecting through the skirt and form pockets, in which the said tree ends have yielding movement, as the tree entire is adjusted in conformity to the animal to which the saddle may be applied. By this means riveting is avoided at this point and the tree ends are shielded and covered. The tree being formed of resilient material, the ends thereof fully conform to the bending thereof required in inserting the same through the openings 15.

Having described my invention, what I claim is—

The herein-described harness-saddle, consisting of the leather skirt having transverse slots formed therein near the ends thereof, the jockey surmounting the said skirt and secured along its edge thereto, the curved resilient thin metallic tree lying closely against the under side of the skirt, bent to form opposite terminals, the entire tree being formed integral and having its ends passed outwardly through the transverse slots of said skirt and the ends thereof loosely extending into pockets formed between the lower ends of the jockey and the skirt, and pads secured to and over the under side of the said tree, as specifically set forth.

In testimony that I claim the foregoing as my own I have hereto affixed my signature in presence of two witnesses.

GEORGE B. GRIGGS.

Witnesses:
GEORGE E. MERCER,
SYLVESTER W. SNOW.